United States Patent [19]

Langer

[11] Patent Number: 4,496,279
[45] Date of Patent: Jan. 29, 1985

[54] ROBOT ARM AND WRIST ASSEMBLY

[75] Inventor: William J. Langer, Eden Prairie, Minn.

[73] Assignee: MTS Systems Corporation, Eden Prairie, Minn.

[21] Appl. No.: 448,217

[22] Filed: Dec. 9, 1982

[51] Int. Cl.³ .......................................... B25J 17/02
[52] U.S. Cl. .................................... 414/735; 901/29; 414/729
[58] Field of Search .............. 414/729, 730, 732, 735, 414/738, 1, 4, 728; 74/417, 801; 901/31, 39, 29

[56] References Cited

U.S. PATENT DOCUMENTS

| | | | |
|---|---|---|---|
| 2,847,663 | 8/1958 | Stoddard | 340/665 |
| 3,108,498 | 10/1963 | James et al. | 74/801 |
| 3,497,083 | 2/1970 | Anderson et al. | 414/738 |
| 3,543,910 | 12/1970 | Devol | 414/728 |
| 3,631,737 | 1/1972 | Wells | 74/469 |
| 3,739,923 | 6/1973 | Totsuka | 414/735 |
| 3,792,782 | 2/1974 | Melton | 414/741 |
| 3,821,498 | 6/1974 | Schaefer, Jr. | 200/18 |
| 3,922,930 | 12/1975 | Fletcher et al. | 74/665 B |
| 3,985,238 | 10/1976 | Nakura et al. | 414/735 |
| 4,047,448 | 9/1977 | Pardo et al. | 74/417 |
| 4,068,536 | 1/1978 | Stackhouse | 74/417 |
| 4,068,763 | 1/1978 | Fletcher et al. | 414/4 |
| 4,076,131 | 2/1978 | Dahlstrom et al. | 414/730 |
| 4,096,953 | 6/1978 | Kellermann et al. | 414/737 |
| 4,275,986 | 6/1981 | Engelberger et al. | 414/730 |
| 4,283,764 | 8/1981 | Crum et al. | 364/513 |
| 4,290,239 | 9/1981 | Zimmer | 51/126 |
| 4,305,028 | 12/1981 | Kostas et al. | 318/565 |

OTHER PUBLICATIONS

Fredrick T. Guttman, "18 Ways to Control Backlash in Gearing", *Product Engineering*, 10/1959.
Brochure Form BR-0101-282 entitled, "The Bendix ML-360 CNC Industrial Robot System".
Bulletin 2-20-82 by Moog Industrial Division entitled, "Moog 3-Axis Electrohydraulic Robot Wrist".
KUKA Industrial Robot, IR 601/60 brochure.
Brochure entitled "Bird-Johnson HydOro-Wrist", from Bird-Johnson Company, featuring 3 Axes Robotic Module.

Primary Examiner—Leslie J. Paperner
Assistant Examiner—Terrance L. Siemens
Attorney, Agent, or Firm—Kinney & Lange

[57] ABSTRACT

A robot arm and wrist assembly provides a plurality of movable arm sections having a tool supporting wrist at the outer end. The arm has two sections that are pivotally mounted together for movement about horizontal axes, and it can be rotated about a vertical axis. The wrist is all hydraulically operated, and provides movement about three mutually perpendicular axes which intersect at a common point. The overall assembly is light, reliable, and easily programmed for remote control. The robot arms can be controlled by external force, velocity or position sensors in a closed loop system.

11 Claims, 13 Drawing Figures

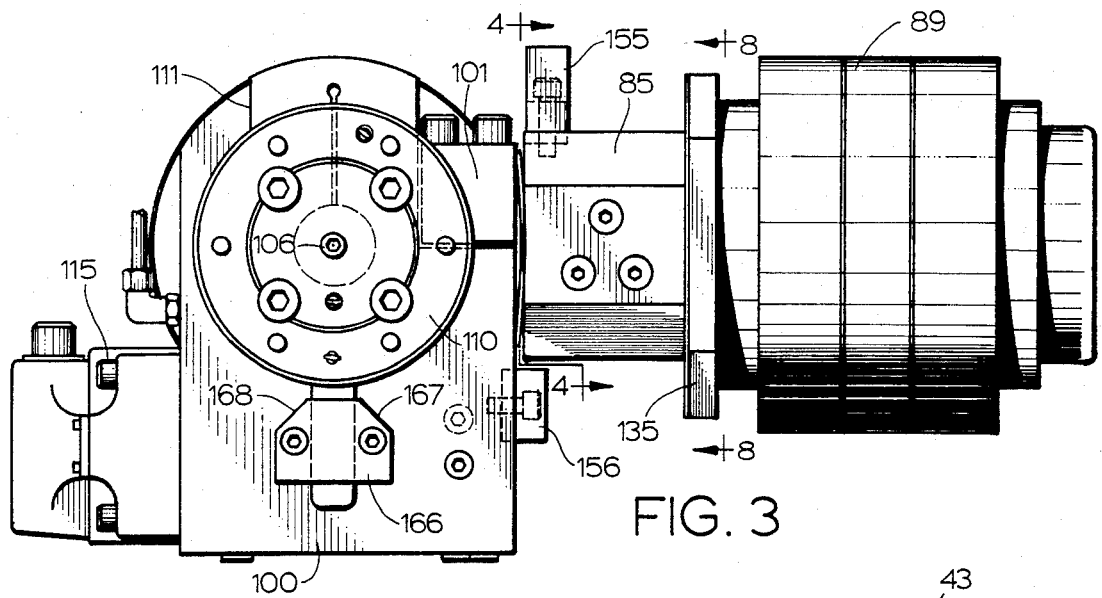

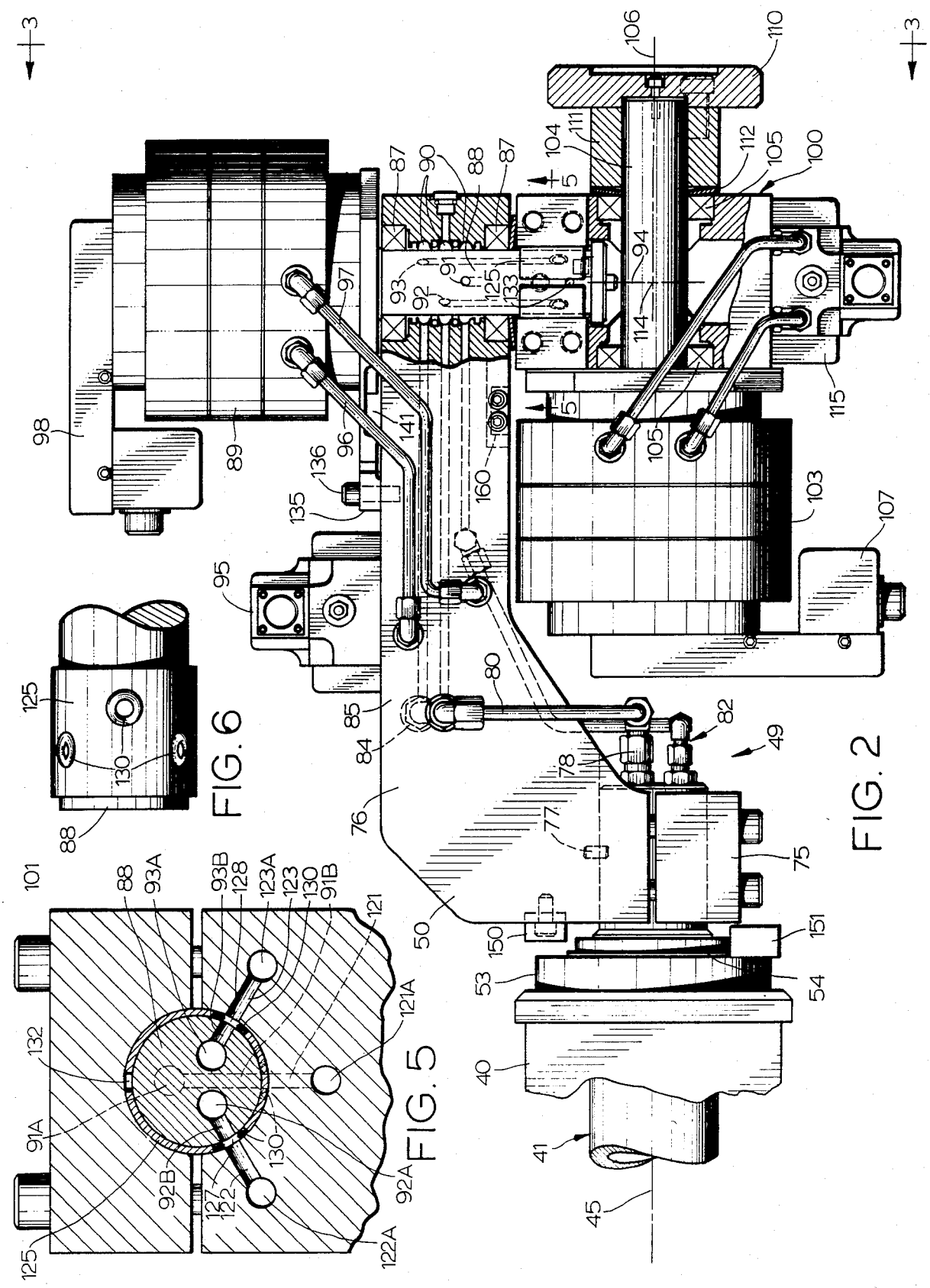

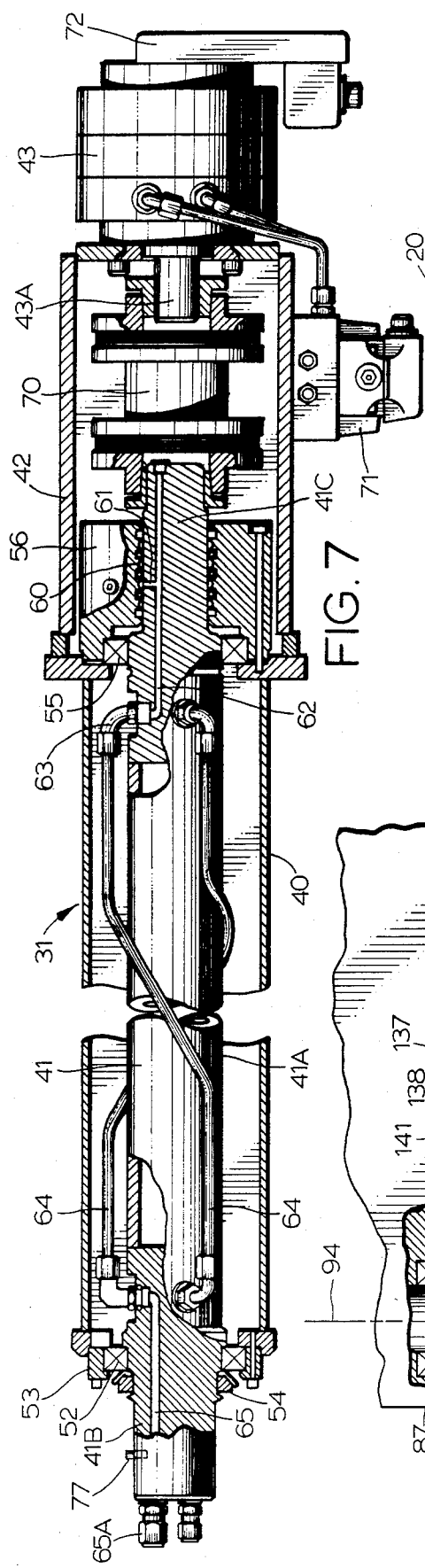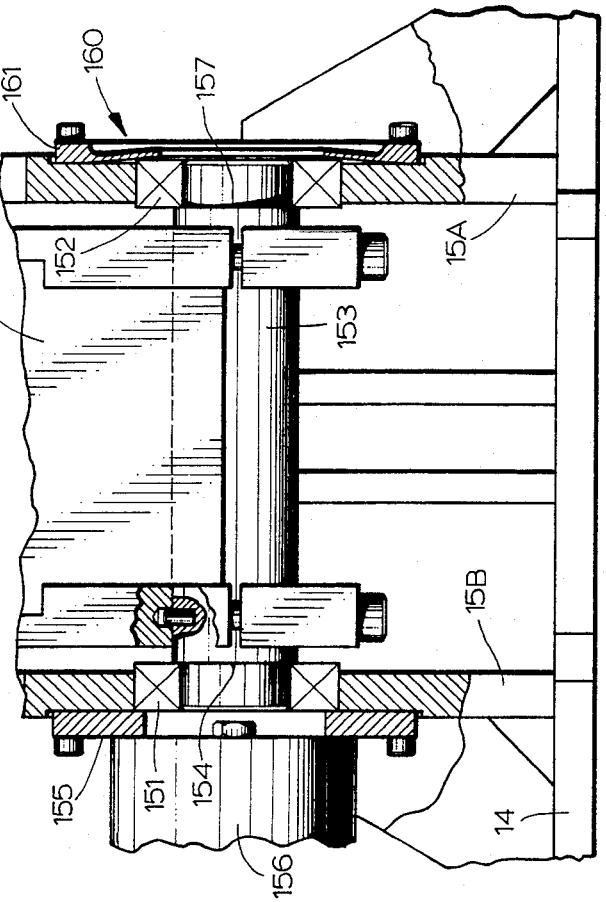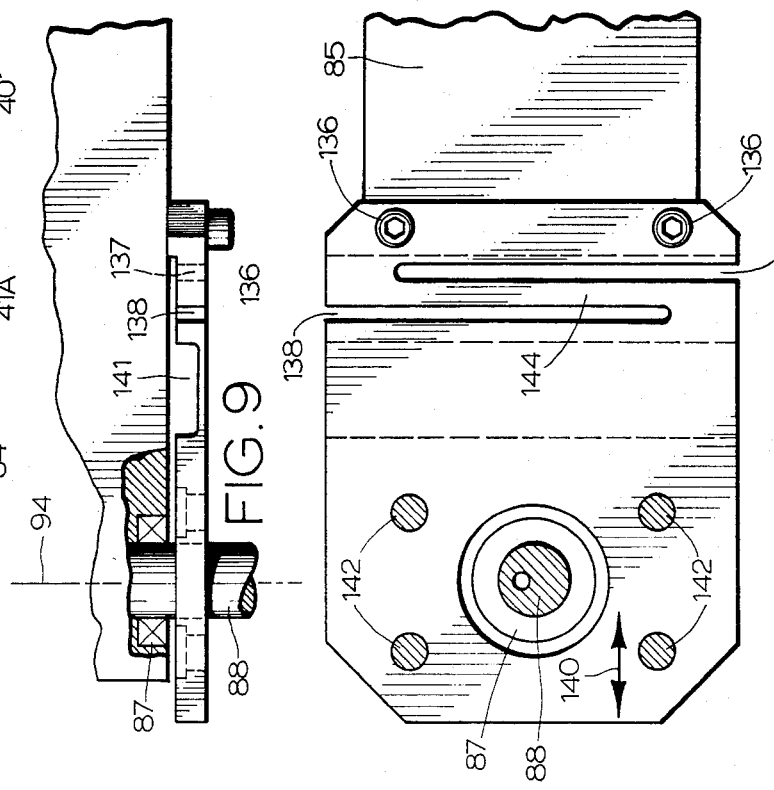

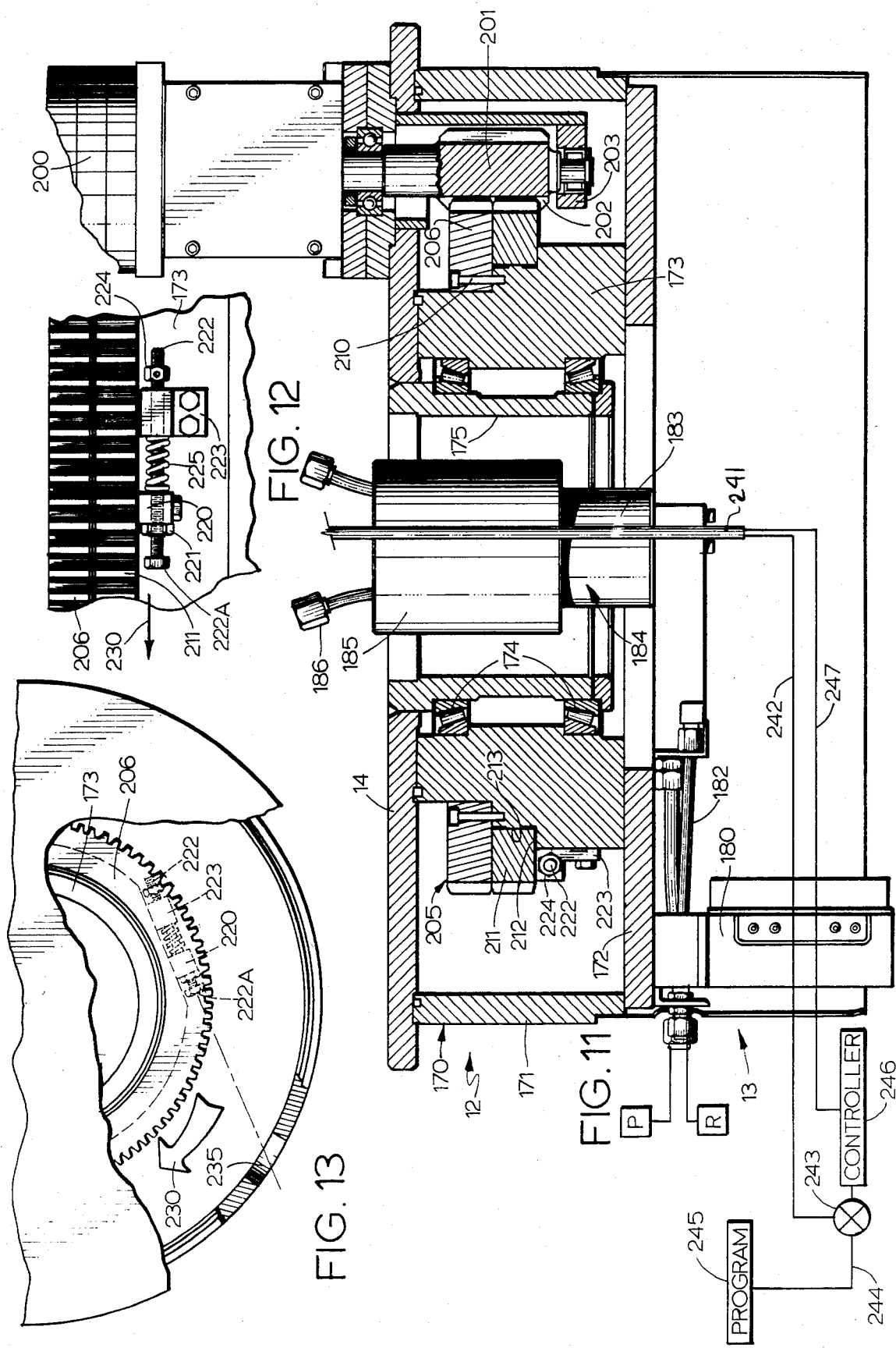

ROBOT ARM AND WRIST ASSEMBLY

BACKGROUND OF THE INVENTION

1. Field of the Invention

The present invention relates to industrial type robotic systems and more particularly to robot arms that have a three axis wrist formed with mutually perpendicular intersecting axes that lends itself well to servo control operation.

2. Description of the Prior Art

A wide variety of modern, industrial type robots have been advanced in recent years. For example U.S. Pat. No. 3,739,923 shows a wrist assembly for a robot that has dual intersecting axes movement and is mounted on a robotic type arm.

U.S. Pat. No. 3,543,910 has a wrist unit that provides a universal joint motion of a clamp tnat is used. The above mentioned patents do not include any continuously rotatable forearm that provides three degrees of freedom about intersecting axis. U.S. Pat. No. 4,076,131 shows an industrial robot having a rotating grip and a movable forearm as part of the robot arm.

U.S. Pat. No. 4,068,536 shows a wrist assembly for robot use which has a gear arrangement for operation of the wrist about three mutually perpendicular, intersecting axes. This device is made by Cincinnati Milacron and is commercially available. Additionally, commercially available robots include industrial robot systems made by the Bendix Robotics Division of Bendix Corporation, Southfield, Mich.; Moog Industrial Division makes a 3-axis Electrohydraulic Robot Wrist, and has literature out showing such wrist; Kuka Welding Systems and Robots sells an industrial robot that has a jointed arm for movement. A hydraulic wrist assembly for robotic use is made and sold by Bird-Johnson Company.

U.S. Pat. No. 4,047,448 shows a servo controlled robot head utilizing three servo motors mounted at the end of the forearm, and operating through concentric shaft drives and gear boxes to control motion about three mutually perpendicular intersecting axes. The use of bevel gears with the three direct drive servo motors at the outer end of the robot arm increases the loads that the robot arm must support, and generally leads to additional mechanism. Any additional drive linkages introduce control errors.

Additionally, a number of patents show general purpose remote control manipulators that have been in use for years, and these include the following patents:

U.S. Pat. Nos. 2,847,663, 3,108,498, 3,497,083, 3,631,737, 3,792,782, 3,821,498, 3,922,930, 3,985,238, 4,275,986, 4,283,764, 4,290,239, 4,096,953 and 4,305,028.

SUMMARY OF THE INVENTION

The present invention relates to a robot wrist construction mounted on an arm that as shown includes at least two sections pivotally mounted together about generally horizontal axes. The arm, as shown, may be pivoted about a vertical axis if desired. The outer end arm section is termed a "forearm assembly" and includes a continuously rotatable mounting shaft on which the wrist is mounted. The wrist has motions about three mutually perpendicular intersecting axes, including the axis of rotation of the forearm.

The wrist assembly is all hydraulically operated with rotary actuators, and includes mounting and manifolding techniques that permit very low moment loads on the arm, and consequently low loads from the actuators themselves. This in turn permits a relatively light weight wrist to provide all of the necessary motions for full programming and closed loop control.

In the form shown, the robot arms can be controlled by external force, velocity or position sensors with conventional servo loop controls providing feedback and positive positioning making the input program easy to control and easy to initially start.

The wrist actuator design is such that the shafts are mounted in a manner to isolate the actuators from loads that are placed on the robot by external mounting. The wrist actuators are each restrained from rotation through a flexure plate that is compliant against all motions except the rotational or torsional motion that is to be restrained. The flexure plate prevents external loads from being carried through the actuator itself. The flexure plates isolate the actuator bearings from such loads and provide a zero backlash drive.

A unique sleeve used to transfer fluid under pressure between a shaft and a hub clamped on the shaft is disclosed which provides for sealing and ease of assembly.

BRIEF DESCRIPTION OF THE DRAWINGS

FIG. 1 is a side elevational view of an industrial robot made according to the present invention;

FIG. 2 is a top view of a robot wrist assembly shown in FIG. 1, but with one of the actuator motors rotated so that the axis of the forearm and the axis of the output shaft are in line;

FIG. 3 is a front end view of the wrist assembly of FIG. 2 taken generally along the line 3—3 in FIG. 2;

FIG. 4 is a fragmentary sectional view taken generally along line 4—4 in FIG. 3; and FIG. 5 is a fragmentary sectional view taken as on line 5—5 in FIG. 2;

FIG. 6 is a bottom plan view of a sleeve that is shown in section in FIG. 5, illustrating the ports formed in the sleeve carrying hydraulic fluid pressure between mating parts;

FIG. 7 is a sectional view of a forearm assembly, with the output shaft of the forearm assembly rotated 90° from its showing in FIG. 1, and with the wrist assembly removed;

FIG. 8 is a fragmentary sectional view taken as on line 8—8 in FIG. 3;

FIG. 9 is a top plan view of the device of FIG. 8;

FIG. 10 is a fragmentary sectional view of a typical bearing backlash take-up utilized for the pivoting joints of the robot arm and taken generally along line 10—10 in FIG. 1;

FIG. 11 is a vertical sectional view of the rotatable base of the robot arm shown in FIG. 1 and showing interior detail;

FIG. 12 is a fragmentary side view of the drive gear arrangement for the rotatable base shown in FIG. 11; and FIG. 13 is a fragmentary top view of the base with parts in section and parts broken away.

DETAILED DESCRIPTION OF THE PREFERRED EMBODIMENT

The robot indicated generally at 10 includes an arm assembly shown generally at 11 mounted on a base or turret 12. The base or turret 12 provides support for the arm assembly and includes a lower portion 13 fixed to the floor, and an upper rotatable plate 14 on which a mounting bracket 15 is fixedly mounted. The plate is rotatable under power about an upright axis. The mounting bracket 15 comprises a pair of side plates 15A and 15B (FIG. 10) which are spaced apart and form a space in which a robot arm 20 is mounted. The arm is mounted to the brackets 15A and 15B with a pivot pin 21.

A double acting servo controlled hydraulic actuator 22 has its base end mounted as at 23 to the brackets 15A and 15B, and has a longitudinally extendable and retractable rod that has a rod end mounted as at 25 to brackets 26 fixed to the arm 20. The actuator 22 is a conventional double acting servo controlled hydraulic actuator and upon extension or retraction of the rod of the actuator, due to differential pressure on an internal piston, the arm 20 will be caused to pivot about the pin 21 comprising a first axis of pivotal movement. The pin 21 is mounted so that its axis is a generally horizontal axis.

At the outer (upper) end of the arm 20 there are a pair of spaced plates 27 that in turn are used for receiving a pair of bracket plates 30 that are mounted to a forearm 31 comprising a part of the robot. The forearm 31 is mounted to the plates 27 with a pin 32. The axis of the pin 32 is parallel to the axis of the pin 21 and forms a second axis of pivotal movement. A servo controlled double acting hydraulic actuator 35 has its base end mounted as at 36 to a bracket 37 fixed to the arm 20. Actuator 35 also has an extendable and retractable rod that has a rod end mounted as at 38 in a conventional manner to the bracket plates 30. Upon extension and retraction of the rod of the actuator 35 (under servo control) the forearm 31 will be caused to pivot about the axis of the pin 32.

The forearm 31 comprises a housing 40 in which an internal shaft 41 (see FIG. 7) is rotatably mounted about its axis 45. The shaft 41 extends into the base end portion 42 of the forearm. A rotary hydraulic actuator 43 is mounted to the base end 42, and has an output shaft 43A that is coupled with a suitable coupling 70 (FIG. 7) to the shaft 41. The outer end of the shaft 41 (at the end of forearm 31 opposite from actuator 43) also extends outwardly from the remote end of the forearm 31, and has a wrist assembly 49 mounted thereon through a coupling member or bracket 50 which will rotate about the axis of the forearm 31 (the axis of the shaft 41) when rotary actuator 43 is operated. The rotary actuator 43 is a double acting hydraulic rotary actuator of conventional design having an outer housing, and a vane type internal actuator that will rotate under differential pressures on the interior of the actuator and cause the shaft 41 to also rotate. The rotary actuators are sold by MTS Systems Corporation, Eden Prairie, Minn., the assignee of this application.

Referring specifically to FIG. 7 for a sectional view of the forearm assembly 31, it can be seen that shaft 41 is rotatably mounted in a suitable bearing 52 mounted in a bracket 53 at the outer end of the housing 40. A suitable nut 54 is used for bearing adjustment. The shaft 41 is made up into a tubular center section 41A, an outer end shaft section (which is solid) 41B and an inner end shaft section 41C. The sections 41B and 41C are welded to the tubular section 41A, and this lightens the overall shaft assembly.

The shaft section 41C is suitably rotatably mounted in a bearing 55 and supported in the base end 42 of the forearm, and a hydraulic commutator sleeve 56 is suitably mounted on the base end 42 and surrounds the shaft end portion 41C. The commutator sleeve has a plurality of individual annular grooves 60, which are sealed from each other and which mate with radially extending ports as shown at 61 (only one of the ports is shown). Each separate port 61 in turn opens into an axial passageway 62 in the shaft end 41C, and then through a suitable fitting 63 to a tube or conduit 64 which leads to another passageway in the shaft end portion 41B. The conduits 64 are used for each of three individual passageways including pressure flow, return flow and drain passageways connected to the hydraulic commutator sleeve 56. The showing of the radial port 61 and passageway 62 is typical. In the shaft end portion 41B, it can be seen that passageways such as that shown at 65 are connected to exterior fittings at the end of the shaft portion 41B. Pressure, return and drain conduits are connected to external ports on sleeve 56 and are carried to suitable connections on the base 12. The conduits can be flexible hoses if desired.

The passageways such as that shown at 62 are plugged suitably at their ends in a conventional manner. The individual annular grooves 60 are sealed from one another with suitable O rings that surround the shaft portion 41C.

The shaft 41 is drivably connected to actuator 43 through a flexible coupling 70 which has one end drivably coupled to the shaft end 41C, and the other end drivably coupled to the output shaft 43A of the rotary actuator 43.

Additionally, the base end 42 of forearm 31 mounts a servovalve indicated at 71 that provides fluid under pressure and return connections to the actuator 43. A rotary displacement sensor 72 is connected to the output shaft 43A of the actuator 43, and provides a feedback signal indicating the rotational position of the shaft 41 with respect to a reference position. Connections from the pressure source used, and to return and drain lines to the commutator sleeve 56, may be made through passageways in the valve 71.

It should be noted that the shaft end 41B has a locating pin receptacle which receives a pin 77 that properly positions the bracket 50 when the bracket is mounted on the shaft end 41B. The bracket 50 has been removed in FIG. 7, and it should also be noted that in FIGS. 2 and 3 the shaft end 41B is rotated 90° from the position shown in FIG. 7.

Referring specifically to FIG. 2, it can be seen that the bracket 50 for the wrist assembly 49 is clamped onto the shaft end portion 41B with a cap member 75 held onto the main bracket portion 76 with suitable cap screws. The bracket portion 76 has the locating pin 77 received in a receptacle in the shaft end portion 41B. The cap 75 is then clamped tightly onto the shaft to hold bracket portion 76 in position and to provide for a rotational driving connection between the shaft end 41B and the bracket 50. The pin 77 is merely a locating pin and not a torque transmitting member. The friction from clamping of cap 75 permits transmitting torque through the connection.

As stated, fluid passageways in shaft end 41B, such as that shown at 65 in FIG. 7, provide pressure, return and drain connections. The passageway 65 shown in FIG. 7 is the return passageway connected to a return fitting 65A. In FIG. 2, a pressure fitting 78 is shown, and the drain fitting 65A is immediately below the fitting 78 and cannot be seen. The fittings 65A and 78 are connected to suitable conduits 80. A return conduit fitting 84 (dotted lines) is on the lower side of the bracket portion 76.

The drain fitting on shaft end 41B is indicated at 82, and connects to suitable drain passageways in the bracket 76.

The bracket 76 portion as shown has a general L shape, comprising a leg 85 offset from the axis 45 of shaft 41 that extends parallel to the axis 45. At the outer end of the bracket leg 85, a bore is formed transverse (perpendicular) to the axis 45 of the shaft 41. Bearings 87 are mounted in the bore (against shouldered bearing seats) for rotatably mounting the output shaft 88 of a rotary hydraulic actuator 89. The shaft 88 has a shoulder against which the inner race of outer bearing 87 seats for locating the actuator 89 relative to the bearings 87 and the bracket leg 85. The hydraulic actuator 89 is a rotary actuator of a conventional vane type, that is operated by fluid under pressure to rotate in either direction of rotation. The housing for the actuator also has bearings which mount the actuator housing on the shaft 88 internally of the actuator housing.

The bore formed in the bracket leg 85 has a plurality of annular grooves 90 therein forming a hydraulic commutator assembly with the shaft 88. The grooves 90 are individual and sealed from each other, and when the shaft 88 is in position in the bore, the grooves 90 are made to align with openings, or ports in the shaft. As shown openings 91, 92 and 93 are provided in the shaft. The openings or ports 91, 92 and 93 connect to separate internal passageways 91A, 92A and 93A in the shaft 88 and comprise drain, pressure, and return passageways, respectively, that extend from the shaft end 41B.

As shown in FIG. 5, the longitudinal passageways 91A, 92A and 93A connect to radially extending passageways shown in FIG. 4 at 918, 92B, and 93B. These passageways are positioned toward the outer end of the shaft as shown in FIG. 2 and open to ports on the surface of shaft 88. As will be explained, connections are made for hydraulic fluid to these passageways 91B, 92B, and 93B.

The bearings 87 are resiliently loaded axially with a Belleville spring 99 between block 100 and the outer bearing 87 (adjacent block 100). The shaft 88 is thus urged so the provided shoulder is against the outer bearing and the spring 99 reacts against the outer bearing 87. This prevents looseness and compensates for wear.

The shaft 88 has an axis 94 which comprises the second axis of operation of the wrist assembly 49 and is perpendicular to the axis 45 of the shaft 41 of the forearm. The third axis of operation of the wrist assembly 49 is the final tool mounting axis, and is perpendicular to the axis 94 of the shaft 88. The motor for controlling rotation of the tool about the third axis is mounted on a mounting block 100 that is drivably clamped onto the outer end of the shaft 88, on the portion thereof that extends outwardly beyond the outer bearing 87. Block 100 is shown perhaps best in FIGS. 2 and 3 and has a clamping cap 101 attached with cap screws to clamp the outer end of the shaft 88 tightly in the bracket or block 100.

The vane type actuator 89 is operable to rotate the shaft 88, and thus the block 100, about the axis 94 of the shaft 88 under control from a servovalve 95 that is mounted onto the side of the bracket leg 85, and which is operated from programming signals to provide pressure and return flow through suitable conduits 96 and 97, to the vane actuator 89. A rotary displacement sensor 98 is provided for determining the rotational displacement of the shaft 88 with respect to a reference position. The sensor 98 provides feedback signals to suitable control circuitry for closed loop servo control.

The block 100 as stated is clamped to move with the shaft 88. The block 100 has internal passageways to carry fluid from the ports 91, 92 and 93 to a valve 115 to control a hydraulic vane motor 103 which has an output shaft 104 that is rotatably mounted in suitable bearings 105,105 in the block 100. The axis 106 of the shaft 104 is perpendicular to the axis 94 of the shaft 88. The shaft 104 also has a shoulder against the bearing 105 adjacent the actuator seats to locate the actuator 103 relative to the block 100. The bearings 105 are seated in shouldered receptacles in block 100. The shaft 104 is held in place in bearings 105 with a cap plate 110. The plate 110 seats against the end of shaft 104. A stop block 111 is clamped on the shaft 164 and a washer (Belleville) spring 112 acts against the outer bearing 105 and block 111 resiliently to hold the provided shoulder of shaft 104 against the inner bearing 105 and thus provide a resilient bearing take-up and also hold the motor 103 axially located relative to block 100.

The axis 106 is the third axis of movement at the wrist. The first axis is axis 45 of the shaft 41; the second axis is axis 94 of the shaft 88; and the third axis is axis 106. These wrist axes all coincide at a common point indicated at 114 in FIG. 2.

The hydraulic rotary actuator 103 is controlled from servovalve 115 that is mounted at the end of block 100 opposite from arm 85. In order to carry fluid between the servovalve 115, and the hydraulic commutator formed by grooves 90 in arm 85 and the passageways in the shaft 88, passageways in block 100 must communicate with the radial passageways 91B, 92B and 93B. As shown in FIG. 5, block 100 contains passageways 121, 122 and 123 which align with the radial passageways 91B, 92B and 93B, respectively when shaft 88 is clamped in the block 100. In order to carry the fluid from the passageways in shaft 88 to block 100 (as clamped in with the cap 101) a sleeve indicated at 125 is provided with three apertures 126, 127 and 128 respectively, (see FIGS. 5 and 6). When the sleeve 125 is properly positioned the apertures 126, 127, and 128 align with the ports leading to passageways 91B, 92B and 93C. Each of the apertures 126, 127 and 128 conforms in curvature to the shaft 88 and a separate O ring 130 that is slightly thicker than the thickness of the sleeve 125 is positioned in each opening. The sleeve 125, as shown is a split sleeve and is held in position on the shaft with a short pin 133 (FIG. 2) that is mounted in an opening in the shaft and protrudes slightly outwardly so that the opposite edges of the slit 132 of sleeve 125 define a passage through which the pin extends. In this way the sleeve 125 is prevented from rotation relative to the shaft 88.

The sleeve 125 is formed as a flat piece of material, and the openings 126, 127 and 128 are punched into the flat piece of material. Then the sheet is rolled into its sleeve shape of the proper diameter for fitting over the shaft 88. In this way the apertures 126, 127 and 128 are elongated slightly and conform to the surface of the shaft but yet will hold O rings 130 in proper position to provide for a fluid tight coupling between the exterior surface of shaft 88, and the interior surface of the block 100 to passageways 121, 122 and 123. The passageways 121, 122 and 123 have longitudinally extending portions 121A, 122A and 123A which are configured as needed to carry over to the end of the block 100 to mate with aligning openings in servovalve 115 and provide for fluid connections to the servovalve.

The ability to use the shafts 88 or 104 as mounting shafts depend in part upon keeping the bending stresses in the shafts 88 and 104 low. These are four bearings on shaft 88, bearings 87 external of actuator 89 and two internal bearings. There are also four bearings on shaft 104, bearings 105 and internal bearings in actuator 103. If the housings for the actuators are bolted solidly, misalignment between the internal and external bearings, together with the fixed mounting could cause excessive bending stress and also wear on the internal moving parts of the actuator. In order to insure that bending loads are not a factor and yet insuring that the torque loads from the actuator are properly reacted back to the supports, a flexible attachment plate is used for connecting the actuator housings to the supports 85 and 100.

As shown in FIGS. 2, 3, 8 and 9, a plate 135 is used. The example shown is for actuator 89 and one edge is connected to the arm 85 with cap screws as shown at 136. The plate 135 has a pair of slits 137 and 138 (through openings), which are parallel, and each slit has a longitudinal axis perpendicular to the axis 45 of the shaft 41. This permits easy flexing of the plate 135 in directions parallel to the plane of the plate, which is parallel to the axis 45 of the shaft 41. This means that movements in direction as indicated by the arrow 140 in FIG. 8 will be easily accommodated, and will not tend to load the outer housing for the actuator 89 (or 103). Additionally, the plate 135 as seen in FIG. 9 has a recess 141 on its inner surface (the surface facing the support) that extends along the full height to provide a very thin cross section in a region between the mounting of the actuator 89 and the mounting bolts 136. Forces parallel to the axis 94 will be substantially unresisted because the plate 135 will bend easily to prevent axial loads from being applied to the actuator housing 89. The housing of actuator 89 is attached to plate 135 with suitable cap screws 142 as shown in FIG. 8. An opening 143 is provided for the shaft 88 to pass through the plate 135 with clearance.

It can be seen that torque loads about the axis of shaft 88 will be resisted very rigidly by compression or tension loading on the web 144 between the slots 137 and 138. Thus the mounting plate 135 for the actuators 89 and 103 restrains torsional loading, but does not cause bending loads to be placed into the actuator shafts.

The actuator 103 also has a rotational displacement readout device 107 connected thereto to provide rotary displacement feedback signals indicating the position of shaft 104 relative to a reference position.

Each of the rotary motions of the wrist assembly 49 is positively stopped through mechanical stop members. The rotation of the shaft 41 aoout the axis 45 is limited by a mechanical stop 150 attached to the base of the bracket 50, and which will engage a second stop block 151 that is fixedly mounted to the end bracket or collar 53 on the housing 40. The stop block 151 can be configured to provide its rotational stop after the desired amount of rotation (less than 360°) in either direction until stop 150 contacts the side of the block 151.

In FIGS. 3 and 4 the stops controlling the rotation of the shaft 88 of the rotary actuator 89 are shown. These stops also control the amount of rotation of block 100. A stop block 155 is bolted to the top of arm 85 in a location overlying the commutator section as shown in FIG. 3. A second stop block 156 is mounted onto the mounting block 100 on a side thereof so that during rotation in clockwise direction as seen in FIG. 1, the blocks 155 and 156 will contact to limit rotation in such clockwise direction. In opposite direction of rotation, the block 156 is adapted to enter a recess 161 in arm 85 (FIG. 4) and engage a stop member 160 mounted on the end of recess 161. The recess 161 is formed sufficiently deep to provide clearance for the stop block 156 until block 156 reaches the stop member 160.

For stopping the "wrist roll" motion, which is the rotation about the axis 106 of shaft 104, the lug 111 as stated, is clamped onto the shaft 104 very tightly. The lug 111 has an outwardly extending end portion which aligns with and will stop against the side surfaces of a stop block 166 that in turn is mounted on the front face of the mounting block 100. The stop block 166 has beveled surfaces 167 and 168 which provide the desired amount of bearing or stopping surface for the lug 111 and which provide approximately 270° of roll movement for the wrist.

As shown in FIG. 10, the pivot joints for the arm section can be made so that the amount of "play" or looseness in the pivot joints is kept at a minimum. A typical automatic bearing adjustment is shown in FIG. 10. The arm 20 is clamped in position between side plates 15A and 15B. Each of the plates have a through bearing opening that mounts bearing 151 and 152. The bearings 151 and 152 can be of any desired type, but normally are bearings that provide for adjustment to keep the elements mounted from having any "play". Bearings 151 and 152 support a shouldered shaft 153 which forms the pivot 21 for the arm 20. As can be seen at a first end of the shaft 153 the bearing 151 is positioned against a shoulder 154 of shaft 153 and is held in the side plate 15B with a fixed clamp ring 155 that provides a stop for the outer race of bearing 151. The bearing 151 is thus trapped between the ring 155 and the shoulder 154. At this end of the shaft, a feedback transducer 156 may be driven from the shaft in a normal manner and also supported on the ring 155.

The bearing 152 at the opposite end of the shaft against a shoulder 157 on shaft 153. The length between the shoulders 154 and 157 is such that the outer edge of the bearing 152 is protruding from the outer side surface of the plate 15A. In order to provide a spring load on the bearing 152 and thus against the bearing 151, an annular spring plate 160 is provided. The spring plate has a rim 161 which is bolted to support plate 15B at its outer periphery, and has an inner annular spring portion 162 which is thinner than the rim and which bears against the outer race of the bearing 152 and urges the bearing 152 toward the plate 15A and thus forces the bearing 152 against the shoulder 157. This in turn, springloads the bearing 151 through the shoulder 154 against the ring 155. The bearing take-up is automatically done through the spring load so that there is no likelihood of increasing "play" or looseness in the pivots of the arm structure. This type of arrangement can be used in all arm pivot joints to prevent looseness or play.

Referring to FIGS. 11 through 13, the base assembly 12 is illustrated. The lower portion 13 of the base is mounted on struts and includes a housing portion 170 to which struts are attached. The housing portion 170 includes an annular outer wall 171 and a base plate 172. In the center of the base plate there is an annular or tubular bearing support 173. Bearing support 173 supports vertically spaced bearings 174,174 on the interior of the support and which in turn rotatably mount a hub 175 supporting the upper base plate 14 which forms the base on which the support 15 is mounted.

The plate 14 overlies the upper edges of the annular outer wall 171, and can be suitably dust sealed. The plate 14 is sufficiently rigid, as is the bearing mounting using bearings 174, so that the plate 114 does not ride on the upper edges of the wall 171. If desired, however, antifriction bearing surfaces may be provided as needed.

A connection block 180 below housing portion 170 houses suitable hydraulic conduits 182 connected to a central stationary member 183 of a hydraulic commutator assembly shown generally at 184. The commutator includes an outer rotatable housing 185 which carries hydraulic fluid pressure from the conduits 182 to suitable conduits such as that shown at 186 that in turn supply fluid under pressure from a source 187 to the hydraulically actuated robot arm. Also, the electrical signals to control the servovalves and carry feedback signals are transmitted from the base to the arm through flexible cables in the space between the housing 185 and support 175.

In order to effect a drive to rotate platform 14, a hydraulic motor indicated at 200 is bolted directly to the top of the plate 14. The motor has an output drive shaft indicated at 201 carrying a long spur gear which is an ordinary spur gear and indicated at 202. Gear 202 is drivably mounted on the shaft 201. A bearing housing 203 extends from the motor into the interior of the housing portion 170 of the base, to support the shaft 201 and gear 202. The hydraulic motor 200 is a conventional hydraulic motor that is variable speed and reversible.

The bearing support 173 is a stationary member, fixed to the lower portion of base 13 and is fastened in place securely to the base plate 172. Support 173 supports a ring gear assembly indicated generally at 205 on its outer surfaces. The ring gear assembly has outer peripheral teeth that are of size to mesh with the spur gear 202 driven by the hydraulic motor 200. The ring gear assembly 205 includes an upper ring gear 206 which is supported on a shoulder and held from rotation relative to support 173 with suitable cap screws, such as those shown at 210, threaded into the bearing support 173. A second portion of the ring gear assembly comprises an annular ring gear 211 which is rotatably slidably mounted on a surface indicated at 212 forming an upwardly facing support surface, and also held relative to a vertical annular surface 213. The gear 211 is free to rotate relative to the upper ring gear 206, as well as relative to the bearing support 173. However, as can be seen, when the spur gear 202 is engaging the teeth of both ring gears 206 and 211, the ring gears will be held from rotation relative to each other.

The split ring gears 206 and 211 provide a way of eliminating backlash in the base rotation drive. A spring loads the gear 211 in a first rotational direction and when the spur gear 206 is in position engaging the teeth of both gear rings as shown in FIG. 11, the spring will urge the teeth of the gear 211 against the spur gear teeth and this in turn will react the spur gear teeth against the teeth of gear 206 to eliminate backlash.

By way of explanation, it can be seen in FIG. 12 that a bracket 220 is fixed to the lower surface of gear 211. A nut 221 is fixed to bracket 220. The nut 221 has a generally horizontal axis (that is, the axis is parallel to the plane of the gear 211,) and a bolt 222 is threadably mounted through the nut 221 and in turn is slidably mounted through an opening in a bracket 223 which is fixed to the bearing support 173 in a suitable manner.

The bolt 222 extends through bracket 223 and has a nut 224 mounted thereon and pinned relative to the bolt so that the nut 224 cannot move relative to the bolt unless it is unpinned. A compression spring 225 is mounted between the brackets 220 and 223, and provides a reaction force tending to separate the brackets and when the spring is compressed tending to move the gear 211 in direction as indicated by the arrow 230.

In FIG. 12, the nut 224 is shown spaced slightly from the edge of the bracket 223, and this is because the gear teeth are held in alignment with the spur gear in position under spring load. However, as soon as the spur gear 202 is removed, the nut 224 will snap down against the bracket 223 and the teeth of the gear 211 and the gear 206 will be offset. The amount of spring load can be adjusted by threading the bolt 222 relative to the nut 221, while the spur gear 202 is removed, and this will then to pull the brackets 220 and 223 together and compress the spring 225.

In order to install the hydraulic motor 200, it is necessary to adjust the bolt 222 until the teeth on the gears 206 and 211 are in alignment so that the spur gear 202 can easily be slid into place. In order to accomplish this, the side wall 71 of the lower housing is provided with an opening as shown at 235, which is large enough to permit a socket wrench to be inserted through the opening 235 and engage the head 222A of the bolt 222. The axis of the bolt is indicated at 236, and it can be seen that this axis aligns with the opening 235 so that the bolt 222 can easily be adjusted. The spring 225 is compressed a desired amount and the teeth of the upper and lower gears are aligned.

Once the spur gear 202 has been slipped into place, engaging the teeth of both gears 206 and 211, and motor 200 anchored, the bolt 222 can be backed off so that the nut 224 is moved away from bracket 223 and the lower gear 211 then is bearing against the spur gear 202 and holds the spur gear teeth under load caused by the spring against the teeth of gear 206.

This spring load then insures that when the hydraulic motor is reversed there will be no "backlash" or "play" in the unit and the position of the robot arm about its vertical axis of the base can always be controlled accurately.

Schematically in FIG. 11, the control arrangement for use with the robot of the present invention is illustrated.

A flex cable assembly indicated generally at 241 is used to carry electrical signals from the stationary part of the base to the pivoting part of the base, namely platform 14. The flexible cable 241 has individual wires carrying individual feedback signals from the various transducers back to the controls, and also carrying individual control signals to the various servovalves that have been mentioned previously. The number of wires represented can be any desired number. As shown, the individual feedback signals can be carried along lines represented by a line 242. There would be a plurality of individual lines carried in the line 242, to individual separate summing junctions 243 (only one is shown) each of which receives an individual control signal along a line 244 from a program control 245 which has been programmed for the motions for the robot. The robot arm assembly does not rotate continuously about the base axis in the form shown and thus a flexible cable 241 can be used for signal transmission to the arm components. If desired a conventional electrical slip ring also could be used.

Again, the representations of single lines is for explanatory purposes only, and there would be separate control lines for each of the program motions to be controlled. The summing junction 243 represented provides an input error control signal to a servo controller 246, which provides output servo control signals along a bus or line 247 back to the flexible cable assembly where the signals are carried to the individual servovalves for operation in accordance with the individual programmed motions.

The controls can be pre-programmed or "taught" by operating manually the robot to generate feedback signals which indicate the desired amount of displacement for each of the individual movements with respect to a reference. Error signal control is utilized for the servovalve in a conventional manner for closed loop control. Repeatable motions will occur on command from the program with the robot arm and wrist assembly not only on the pivotal movement of the arms, but also for the individual three axis movements for the wrist assembly.

Suitable tools, such as wrenches or the like can be mounted on the plate 110, and it should be noted that the plate 110 is drivably mounted on the output shaft 104 for the actuator 103 so that various tools can be mounted thereon. The plate 110 can be termed a tool mounting member, because it will be used for mounting the tools which the robot will use during operation.

What is claimed is:

1. A robot arm and wrist assembly comprising a mounting arm, a coupling member having a base mounted on said mounting arm for rotation about a first axis, and the coupling member having an offset bracket portion offset from the base and extending in direction along and spaced from the first axis to provide an unobstructed space around said first axis when the coupling member is rotated about the first axis, a first actuator mounted on said offset bracket portion of the coupling member, said first actuator having a housing mounted on an opposite side of the offset bracket portion from the first axis and a first rotatable output shaft extending from the housing toward the first axis and rotatable relative to the housing and the coupling member about a second axis perpendicular to the first axis, said first and second axes intersecting, and a second actuator drivably mounted on the rotatable output shaft of the first actuator within the unobstructed space defined by the offset bracket portion, said second actuator having a second output shaft rotatable about a third axis which generates a plane in which the first axis lies when the second actuator is rotated with the first output shaft about the second axis, in at least one rotational position of the second actuator about the second axis the first and third axes coinciding, the unobstructed space around the first axis permitting the second actuator to be rotated to position between the base of the coupling member and the second axis with the first output shaft.

2. A robot arm and wrist assembly comprising a mounting arm, a base supporting said mounting arm, means to rotatably mount said mounting arm on said base for rotation about a generally vertical axis, said mounting arm including a first arm section pivotally connected to said base about a generally horizontal axis, and a forearm member pivotally connected to said first arm section about a different generally horizontal axis, power means to control movement of the mounting arm selectively about the vertical axis, and the first arm section and forearm members about their horizontal axes, a forearm shaft rotatably mounted on the forearm member about a first axis, a first actuator mounted on the forearm member and coupled to the forearm shaft to selectively rotate the forearm shaft, a coupling bracket mounted on said forearm shaft, a second actuator mounted on said coupling bracket, said second actuator having a second rotatable shaft rotatable about a second axis perpendicular to the first axis, said first and second axes intersecting, a mounting block drivably mounted on the second output shaft and a third actuator mounted on said mounting block so that upon rotation of said second output shaft the mounting block and third actuaor rotate about the second axis, said third actuator having a third output shaft rotatable about a third axis, said first and third axes lying in a common plane, said second output shaft having shaft fluid passageways defined therein opening to first and second sets of ports at opposite ends of the shaft passageways, hydraulic commutator means formed between portions of said coupling bracket adjacent said second output shaft and first ports of said second output shaft to carry fluid pressure to the passageways in said second output shaft, said mounting block having block fluid passageways defined therein corresponding to the fluid passageways in the second shaft and the block passageways having third and fourth ports at the opposite ends thereof, means coupled between said second ports of the shaft passageways and said third ports of said block passageways to carry fluid to the passageways in said mounting block, a separate control valve for said third actuator mounted on said mounting block and connected to the fourth ports of the passageways in said mounting block, and control means to individually and selectively control movement of said first and second actuators and said separate control valve.

3. The robot arm and wrist assembly of claim 2 wherein said power means to control movement of the mounting arm about the vertical axis includes a drive motor on said means to rotatably mount said mounting arm, said drive motor having a motor output shaft rotatable about a generally vertical axis, a drive gear mounted on the motor output shaft, a ring gear assembly mounted on said base and having outer teeth, said ring gear assembly including two gear sections, one of which is fixedly mounted to said base and the other of which is rotatably mounted relative to the one gear section, bias means connected between said one gear section and the other gear section, said drive gear mounted on said motor output shaft engaging the teeth of both of said gear sections when the motor is in operating position, adjustment means to said bias means providing a resilient force tending to cause the one gear section and other gear section of said ring gear assembly to rotate relative to each other, said rotation of said gear sections being resisted by the drive gear mounted on said motor during use.

4. The robot arm and wrist assembly as specified in claim 2 wherein said first, second and third actuators are rotary type actuators which are under hydraulic servovalve control.

5. A powered mechanical wrist assembly for use with a mounting arm comprising bracket means adapted to be rotatably mounted on a mounting arm for rotation about a first axis, a first rotary hydraulic actuator mounted on said bracket means, said first actuator having a first rotatable output shaft rotatable about a second axis perpendicular to the first axis, said first and second axes intersecting, a servovalve mounted on said bracket means for controlling the first actuator, a second rotary hydraulic actuator, means to mount the second rotary hydraulic actuator on the first rotatable output shaft of the first actuator, said second actuator having a second output shaft rotatable about a third axis perpendicular to the second axis, a second servovalve mounted on the means to mount the second actuator for controlling the second actuator independently of the first actuator, said first and second actuators each have an outer housing, and bearing means external of the respective housings mounting the output shafts to said bracket means and the means for mounting the second actuator, respectively, said bearing means being spaced longitudinally along the respective output shaft to independently support the respective output shaft, and separate means for restraining rotation of the housings of the first and second actuators, said means for restraining rotation comprising a separate flexure coupling plate easily flexed in all axes of movement except rotational movement about the respective axis of the output shafts, said flexure plates defining planes and being attached to the respective actuator housings with the planes of the respective plates perpendicular to the axis of the respective actuator output shaft.

6. A robot arm and wrist assembly comprising a mounting arm, a coupling member rotatably mounted on said mounting arm for rotation about a first axis, a first rotary hydraulic actuator having a housing and a first rotatable output shaft extending from the housing, bearing means external of the housing and spaced along the shaft for rotatably mounting the first shaft to said coupling member for rotation about a second axis perpendicular to the first axis, said first and second axes intersecting, a second rotary hydraulic actuator mounted on and rotatable with the first rotatable output shaft of the first actuator, said second actuator having a second output shaft rotatable about a third axis which third axis defines a plane in which the first axis lies when the second actuator is rotated about the second axis, and hydraulic commutator means carried by said coupling member, said first shaft having ports forming a portion of the hydraulic commutator means to provide for fluid connection to the second actuator.

7. The apparatus as specified in claim 6 and means to carry fluid from said first shaft to the second actuator including a bracket, said bracket having a hub, a sleeve mounted in said hub and surrounding said first shaft and having openings therethrough, said sleeve being mounted for rotation with said first shaft and being formed from a flat sheet having holes punched therethrough and subsequently formed to a generally cylindrical configuration to fit around said first shaft, the first shaft having a second set of ports spaced from the ports forming the hydraulic commutator and each port of the second set of ports aligning with a hole in the sleeve, and "O" ring means in each hole and sealing on the first shaft surface and the hub to form passageways through the sleeve for flow of hydraulic fluid.

8. A robot arm and wrist assembly comprising a mounting arm, a coupling member rotatably mounted on said mounting arm for rotation about a first axis, a first actuator having a housing and a first rotatable output shaft rotatable about a second axis perpendicular to the first axis, said first and second axes intersecting, means to mount the first actuator to the coupling member including means to restrain rotation of said first actuator about the axis of rotation of the first actuator shaft, said means to restrain rotation comprising a flexure coupling plate easily flexed in all axes of movement except rotational movement about the axis of the first shaft, and a second actuator mounted on the rotatable output shaft of the first actuator, said second actuator having a second output shaft rotatable about a third axis which generates a plane in which the first axis lies when the second actuator is rotated about the second axis.

9. The apparatus of claim 8 wherein said flexure plate defines a plane and is attached to the first actuator with the plane of the flexure plate perpendicular to the axis of the first actuator output shaft.

10. A robot arm and wrist assembly comprising a mounting arm, a coupling member rotatably mounted on said mounting arm for rotation about a first axis, a first actuator mounted on said coupling member, said first actuator having a housing and a first rotatable output shaft rotatable relative to the housing about a second axis perpendicular to the first axis, said first and second axes intersecting and a second actuator mounted on the rotatable output shaft of the first actuator, said second actuator having a second output shaft rotatable about a third axis which generates a plane in which the first axis lies when the second actuator is rotated about the second axis, a pair of bearings external of the first actuator for mounting the first actuator output shaft, said bearings being supported by the coupling member, means to mount the second actuator on the output shaft of the first actuator comprising a bracket mounted on the first actuator output shaft on a side of the pair of bearings opposite the first actuator housing, and means to resiliently urge take-up of wear in the pair of bearings comprising a Belleville spring acting between the coupling member and the bracket to exert an axial force on the pair of bearings through said first output shaft and the mounting of the bearings to the coupling member.

11. For use in combination with a rotary actuator having a housing and an output shaft rotatable relative to the housing, the actuator being adapted to be supported by its output shaft relative to a support member with the output shaft being rotatably mounted relative to the support member, the improvement comprising means to restrain rotation of the housing of such rotary actuator relative to such support member comprising a flexure plate flexible in substantially all axes of movement except rotational movement about the axis of the output shaft of an actuator to be mounted on the support member, said flexure plate having a mounting portion adapted for attachment to such support member to rigidly support the flexure plate, the flexure plate having means for attaching to such actuator housing at location spaced from the mounting portion, said plate having at least a pair of slots extending transversely to a line between the axis of an output shaft of a mounted actuator and the mounting portion, each slot extending from an edge of the plate and commencing on opposite sides of the plate and extending substantially across the entire plate, both slots being between the mounting portion and the means for attaching, the plate having a narrow web section of reduced thickness in direction perpendicular to the plane of the plate between the mounting portion and the means for mounting to permit the plate to bend in direction perpendicular to the plate between the mounting portion and the means for mounting.

* * * * *